United States Patent
De Valenzuela

[15] 3,676,900
[45] July 18, 1972

[54] SYSTEM OF FIXING BRAIDED CABLES AND RODS SUBJECTED TO STRESS

[72] Inventor: Ricardo De Valenzuela, Villaverde 45, Barredo Madrid, Spain

[22] Filed: March 5, 1970

[21] Appl. No.: 16,699

[30] Foreign Application Priority Data

April 19, 1969 Spain .................................. 366249

[52] U.S. Cl. .................................................... 24/126 L
[51] Int. Cl. ...................................................... F16g 11/02
[58] Field of Search ............. 24/122.6, 123 W, 126 L, 136 L, 24/129 W; 52/223 L; 287/20.3, 83, 114; 339/273, 247

[56] References Cited

UNITED STATES PATENTS

| | | | |
|---|---|---|---|
| 2,686,963 | 8/1954 | Freyssinet | 24/122.6 |
| 3,123,879 | 3/1964 | Boduroff et al. | 24/122.6 |
| 3,254,383 | 6/1966 | Ehmann | 24/126 L |

Primary Examiner—Bobby R. Gay
Assistant Examiner—Darrell Marquette
Attorney—Richard P. Alberi

[57] ABSTRACT

The present invention relates to improvements in the system of fixing braided cables and rods subjected to stress, which essentially consist in a truncated-conic crown of adequate thickness whose contour includes regularly spaced and sensibly semicircular recesses each of which is aimed to have housed therein the corresponding braided cable. Radially disposed and in front of the said recesses the same crown, but by its inner contour, includes triangular grooves weakening by that part the cross section of the crown in order to allow a deformation thereof permitting it to have a close adaptation to the necessary form and to obtain a retention pressure being practically uniform for all the cables.

2 Claims, 3 Drawing Figures

Patented July 18, 1972 3,676,900

SYSTEM OF FIXING BRAIDED CABLES AND RODS SUBJECTED TO STRESS

The present invention relates to improvements in the system of fixing bundles of rods or braided cables subjected to stress, particularly applicable to the post-stressing process.

As it is known, in the process of post-stressed girders there are utilized steel round trusses or cables which are subjected to stress once the components of said resisting elements have been jointed.

At present there exist various systems for fixing said stressing elements, particularly for steel rounds. The application of said system and devices to the fixing of cables meets serious disadvantages due to the deformation suffered by the squeezing elements (wedges) for achieving the necessary grasping effect over each of the streaded wires forming the cable.

By means of the present invention it is introduced a new improvement in the anchorage system of the traction elements, which improvement does consist in a new wedge formed by a thick wall capable of supporting the cutting effects caused by the radial pressures, and at the same time capable of admitting possible deformation allowing it to have a close adaptation to the necessary form and to obtain a retention pressure being practically uniform for all the cables.

The new wedging system does substantially consist in a truncated-conic crown of adequate thickness whose contour includes regularly spaced and sensibly semicircular recesses each of which is aimed to have housed therein the corresponding braided cable. Radially disposed and in front of the said recesses the same crown, but by its inner contour, includes triangular grooves weakening by that part the cross section of the crown in order to allow the already said deformation.

In order to enable the invention to be more easily understood, in the annexed drawings, complementary to this exposition, there is represented a practical form for its industrial embodiment, which is included merely by way of information and, consequently, is in no wise limitative of the invention.

In the said drawings FIG. 1, shows a perspective view of a wedging crown for eight braided cables, according to an embodiment of the invention.

In the said Figures:
1. Wedging crown.
2. Recesses for housing the cables.
3. Grooves for deformation.
4. External ring.
5. Cable.

Figure 1:
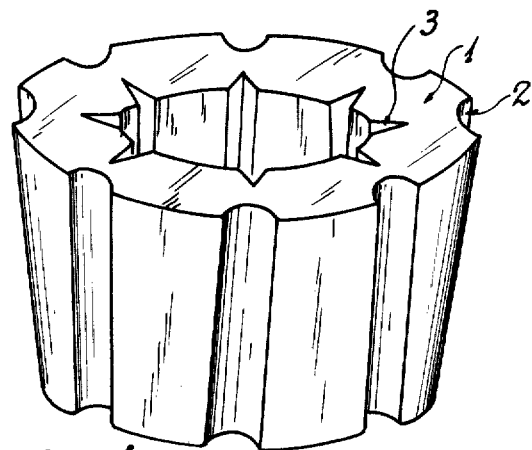

As it has already been mentioned the main element of the invention is the wedging crown (1) represented in FIG. 1, which does consist in a truncated-conic body in which the lateral surfaces include recesses (2), sensibly semi-cylindrical, regularly spaced for eight cables, whose crown shows in a radial disposition, triangular grooves (3) that remain in front of the corresponding recesses (2). The depth of the recesses must be greater than the radius of the wire or rod to be placed therein.

Figure 2:
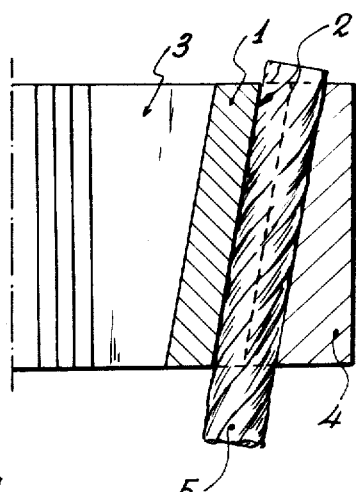
FIG. 2, shows a section of the device anchoring the cables in which it is included the said crown.
Figure 3:
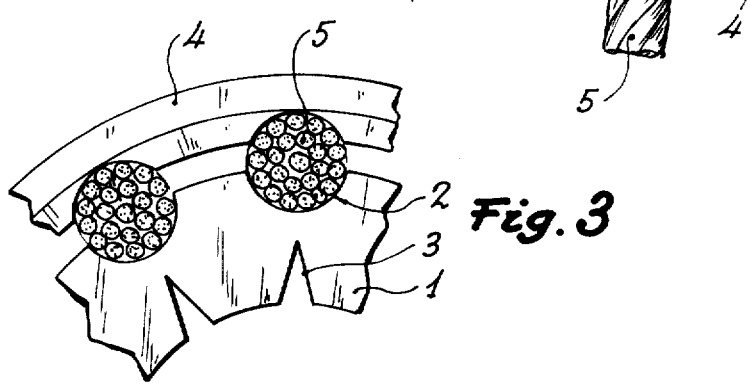
FIG. 3, shows a partial front view of the ends of the cables anchored according to the system corresponding to this invention.

The application of the device is represented in detail and as a whole in FIGS. 2 and 3. In the said figures the aforementioned crown (1) is placed within the outer ring (4), the inner surface of which shows the same conical shape as the exterior one of the crown (1). The cables (5) remain semi-housed in recesses (2) and compressed against the inner surface of the ring (4).

On stressing the bundle of cables, these tend to draw the piece (1) in respect of the piece (4), so that the desired wedging effect is attained, this wedging being uniform due to the anchorage caused by the form of the piece (1) in an independent manner for each cable. Pressure resulting from the inner and exterior pieces through each of the cables is uniform along all its length.

An important feature of this invention is the fact that the bottom of the recesses (2) serve to house and clamp the cables (5) between their two edges. This may be achieved by making the wall between the recesses (2) and the inner conical bore hole sufficiently thin; but then there is the risk that the recess may not have enough thickness to support the cutting action produced by radial pressure of the cable.

This problem is overcome in the present invention by creating interior grooves (3) which permit a sufficient general thickness of the wedging crown (1), and yet weakens the zone in the center thereof to permit the clamping mentioned above.

Therefore, a deformable wedge is provided which, upon reducing its radial dimension by the effect of a cable tension, clamps the cables laterally over a large contact surface.

Likewise the system disclosed in the present patent application may be used for bundles of parallel rods or wires subjected to traction forces.

The nature of the invention having been sufficiently described, and examples of the practical implementation thereof having been given, it only remains to add that in the complex and the parts described it is possible to introduce changes of materials, form and arrangement, provided that such alterations do not suppose any substantial variation in the invention.

What is claimed is:

1. An anchor for tension members subjected to tensile stress comprising:
   an external ring having a conical inner surface;
   an internal wedging crown having an inner surface and an outer surface, said outer surface having a truncated-conical configuration conforming with said conical inner surface of said ring and having longitudinal recesses therein for receiving said tension members, said inner surface of said crown having longitudinal deformation grooves therein to allow said crown to deform sufficiently to conform said recesses to said tension members when subjected to said stresses, whereby said tension members are held between said external ring and said internal crown by radial wedging stresses and tangential stresses resulting from said tensile stress.

2. The anchor as claimed in claim 1 wherein said deformation grooves are of triangular cross-section and are disposed in radial alignment with said recesses.

* * * * *